US012753813B2

(12) United States Patent
Lee

(10) Patent No.: US 12,753,813 B2
(45) Date of Patent: Oct. 6, 2026

(54) BRAKE DEVICE AND VEHICLE

(71) Applicant: HYUNDAI MOBIS CO., LTD., Seoul (KR)

(72) Inventor: Jong Min Lee, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 496 days.

(21) Appl. No.: 18/210,945

(22) Filed: Jun. 16, 2023

(65) Prior Publication Data

US 2024/0141961 A1 May 2, 2024

(30) Foreign Application Priority Data

Oct. 26, 2022 (KR) ........................ 10-2022-0139048
Mar. 21, 2023 (KR) ........................ 10-2023-0036866

(51) Int. Cl.
*F16D 65/097* (2006.01)

(52) U.S. Cl.
CPC ..... *F16D 65/0972* (2013.01); *F16D 65/0975* (2013.01); *F16D 65/0977* (2013.01)

(58) Field of Classification Search
CPC ............. F16D 65/0977; F16D 65/0972; F16D 65/0975; F16D 65/092; F16D 65/097; F16D 65/0979
See application file for complete search history.

(56) References Cited

U.S. PATENT DOCUMENTS 4,460,067 A * 7/1984 Katagiri .................. F16D 66/02 188/1.11 W
6,527,090 B1 * 3/2003 Barillot ............... F16D 65/0972 188/73.1
6,920,965 B2 * 7/2005 Burgdorf ............ F16D 65/0975 267/179
9,016,442 B2 * 4/2015 Odaira ................ F16D 65/0006 188/73.38
9,388,868 B2 * 7/2016 Merrien .............. F16D 65/0006
9,689,445 B2 * 6/2017 Merrien ................ F16D 55/228
(Continued)

FOREIGN PATENT DOCUMENTS

CN 110375025 A 10/2019
DE 1168181 B * 4/1964
(Continued)

OTHER PUBLICATIONS

Korean Office Action dated Jul. 5, 2026 issued in Korean Patent Application No. 10-2022-0139048 (with English translation).

*Primary Examiner* — Robert A. Siconolfi
*Assistant Examiner* — Mahbubur Rashid
(74) *Attorney, Agent, or Firm* — Morgan Lewis & Bockius LLP

(57) ABSTRACT

A brake device includes a caliper body, a brake pad disposed on the caliper body and including a friction member positioned on a first surface thereof and side protrusions protruding from left and right side surfaces of the brake pad, a return spring having one side coupled to the side protrusion of the brake pad and the other side coupled to the caliper body, and a load spring having one side coupled to the side protrusion of the brake pad and the other side coupled to the caliper body, and supporting a weight in a vertical direction of the brake pad. As a pad liner is removed and the three functions of the pad liner are separately achieved, a size of an unnecessary member is reduced and a performance is improved.

16 Claims, 11 Drawing Sheets

(56) References Cited

U.S. PATENT DOCUMENTS

| | | | | | |
|---|---|---|---|---|---|
| 10,563,716 | B2 * | 2/2020 | Foucoin | F16D 55/227 | |
| 10,774,889 | B2 * | 9/2020 | Baek | F16D 65/0972 | |
| 2002/0043436 | A1 * | 4/2002 | Burgdorf | F16D 65/0975 | 188/73.38 |
| 2009/0159376 | A1 * | 6/2009 | Rossignol | F16D 65/0978 | 188/73.38 |
| 2011/0056778 | A1 * | 3/2011 | Roth | F16D 65/0976 | 188/234 |
| 2011/0120821 | A1 * | 5/2011 | Shimamura | F16D 65/0972 | 188/234 |
| 2013/0192939 | A1 * | 8/2013 | V. | F16D 65/0972 | 188/73.38 |
| 2014/0326548 | A1 * | 11/2014 | Merrien | F16D 65/0977 | 188/73.38 |
| 2014/0339026 | A1 * | 11/2014 | Gutelius | F16D 65/0977 | 188/72.3 |
| 2020/0040953 | A1 * | 2/2020 | Baek | F16D 65/0972 | |

FOREIGN PATENT DOCUMENTS

| | | | | | |
|---|---|---|---|---|---|
| DE | 102016004720 | A1 * | 2/2017 | F16D 65/543 |
| FR | 3075902 | B1 * | 4/2020 | F16D 65/0979 |
| JP | 2011106558 | A * | 6/2011 | F16D 65/0972 |
| JP | 4820383 | B2 * | 11/2011 | |
| JP | 2015-001294 | A | 1/2015 | |
| KR | 10-2004-0055970 | A | 6/2004 | |

* cited by examiner (a)

(b)

(a)

(b)

(a)

(b)

BRAKE DEVICE AND VEHICLE

This application claims the benefit of Korean Patent Application Nos. 10-2022-0139048, filed on Oct. 26, 2022 and 10-2023-0036866, filed on Mar. 21, 2023, which is hereby incorporated by reference as if fully set forth herein.

BACKGROUND

Field

The present embodiments relate to a brake device applied to a vehicle and a vehicle equipped with the same, and more specifically, to a brake device and a vehicle equipped with the same that simplify a structure of a pad liner for supporting a brake pad on a side of the brake pad and improve a performance.

Discussion of the Related Art

A brake device mounted in a vehicle is a device for decelerating or stopping the traveling vehicle or maintaining the stopped state of the vehicle, and is a device located inwardly of a rotating wheel and applying a great pressure to a disk-shaped brake disk rotating together with the wheel from both sides using brake pads to brake the vehicle.

In the conventional brake device, the two brake pads disposed on both sides of the disk are supported in a state capable of moving forward and backward on a seating surface inside a caliper body fixed to the vehicle. A pad support pin for guiding the forward and backward movement of the brake pad and a spring member for elastically supporting upper portions of two pad plates to prevent vibration of the pad plate and to ensure a smooth return operation are installed.

The brake device may be largely classified into a drum type and a disk type. The drum type uses a shoe in contact with an inner surface of a cylindrical drum to stop the vehicle, and the disk type stops the vehicle by bringing the brake pads into contact with a surface of the brake disk rotating together with the wheel. In the disk type, a caliper, as a housing where the brake pads are located, is coupled to the wheel. Compared to the drum type, the disk type has a simpler structure and has a smaller volume, and thus, is applied to a passenger vehicle. Either one of the two methods may be used, or the disk type may be applied to a front portion and the drum type may be applied to a rear vehicle.

A conventional brake device includes a pair of brake pads disposed such that first surfaces thereof on which friction materials are located face each other on both sides of the brake disk. The brake pad is supported in the caliper body fixed to the vehicle in a state capable of moving forward and backward in a first direction toward the brake disk and in a second direction opposite to the first direction.

The caliper body may be coupled to the brake pads on left and right sides of the brake pads such that the brake pads may move in the first direction and the second direction, and may include a pad liner positioned between the brake pad and the caliper body.

The pad liner may include a plurality of elastic portions to support the brake pad such that the brake pad does not sag or be biased to one side in a horizontal direction and to apply a restoring force in the second direction.

The pad liner guides a position of the brake pad such that the brake pad is placed at a correct position without being biased to the one side, but, due to a gap between the pad liner, the brake pad, and the caliper, may degrade a braking performance of the brake device and affect noise generation and drag.

Due to such problems, the return operation of the brake pad is incomplete, and the drag characteristics and the braking noise are caused, so that there is a need to reduce such problems.

SUMMARY

Embodiments of the present disclosure relate to a brake device and a vehicle for solving the above problems, and are, more specifically, to provide a brake device and a vehicle equipped the same that remove a pad liner and separately achieve three functions of the pad liner from each other to reduce a size of an unnecessary member and improve a performance.

The problems to be solved in the present disclosure are not limited to the technical problems mentioned above, and other technical problems not mentioned will be clearly understood by those with ordinary knowledge in the technical field to which the present disclosure belongs from the description below.

Provided is a brake device including a caliper body, a brake pad disposed on the caliper body and including a friction member positioned on a first surface thereof and side protrusions protruding from left and right side surfaces of the brake pad, a return spring having one side coupled to the side protrusion of the brake pad and the other side coupled to the caliper body, and a load spring having one side coupled to the side protrusion of the brake pad and the other side coupled to the caliper body, and supporting a weight in a vertical direction of the brake pad, wherein the return spring provides elasticity for restoring a position of the brake pad that has moved in a first direction in a second direction opposite to the first direction.

The return spring may include a pad-coupled portion coupled to the side protrusion, a horizontal elastic portion extending in the second direction from the pad-coupled portion, and a spring hook caught on the caliper body at an end of the horizontal elastic portion.

The pad-coupled portion may include a first pad-coupled portion coupled to a first surface of the side protrusion, and a second pad-coupled portion extending in the second direction from the first pad-coupled portion and coupled to a side surface of the side protrusion.

The side protrusion may include a first spring groove defined in the first surface of the side protrusion so as to correspond to the first pad-coupled portion, and a second spring groove defined in the side surface of the side protrusion, wherein the second pad-coupled portion is inserted into the second spring groove.

The side protrusion may include a third spring groove extending in the first direction defined in a side surface thereof, and the pad-coupled portion may include a third pad-coupled portion inserted into the third spring groove.

The brake pad may further include a coupling protrusion protruding from the side surface of the side protrusion and having a vertical dimension smaller than a vertical dimension of the side protrusion to form a step, and the third spring groove may be defined at the step between the coupling protrusion and the side protrusion.

The third spring groove may be defined at each of an upper side and a lower side of the coupling protrusion, and the return spring may include a pair of third pad-coupled portions respectively coupled to the pair of third spring grooves, and a spring connection portion for connecting ends of the pair of third pad-coupled portions in the first direction to each other.

The pair of third spring grooves may be respectively retracted in a downward direction of the coupling protrusion and in an upward direction of the coupling protrusion in opposite directions.

The horizontal elastic portion may include a pair of horizontal elastic portions and the spring hook includes a pair of spring hooks, and the pad-coupled portion may have a U-shape connected to the pair of elastic portions.

The caliper body may include a side slot receiving the side protrusion inserted thereinto and extending in the first direction, and a protrusion extending from the side slot in the second direction, and the spring hook may be caught on the protrusion of the caliper body.

The caliper body may include a side slot receiving the side protrusion inserted thereinto and extending in the first direction.

The load spring may include a spring clip fitted to an upper side of the side protrusion, and a vertical elastic portion in a U-shaped protruding from the spring clip in the second direction and bending again in the first direction, and a lower end of the vertical elastic portion may be in contact with a lower portion of the side slot.

The brake device may further include a clip protrusion formed on the side protrusion, and the spring clip may include a fixing hole, wherein the clip protrusion is fitted into the fixing hole.

The brake device may further include a torque shim coupled to the side surface of the brake pad, located below the side protrusion, and facing the caliper body.

Provided is a vehicle including a vehicle body, a wheel located beneath the vehicle body and rotating, a brake disk coupled to the wheel and rotating together with the wheel, a brake pad disposed on a caliper body and including a friction surface on one surface thereof and side protrusions protruding from left and right side surfaces thereof, a return spring having one side coupled to the side protrusion of the brake pad and the other side coupled to the caliper body, and a load spring having one side coupled to the side protrusion of the brake pad and the other side coupled to the caliper body, and supporting a weight in a vertical direction of the brake pad, wherein the return spring provides elasticity for restoring a position of the brake pad that has moved in a first direction in a second direction opposite to the first direction.

The return spring may include a pad-coupled portion coupled to the side protrusion, a horizontal elastic portion extending in the second direction from the pad-coupled portion, and a spring hook extending from an end of the horizontal elastic portion and caught on the caliper body.

The pad-coupled portion may include a first pad-coupled portion coupled to a first surface of the side protrusion, and a second pad-coupled portion extending in the second direction from the first pad-coupled portion and coupled to a side surface of the side protrusion, and the side protrusion may include a first spring groove defined in the first surface of the side protrusion so as to correspond to the first pad-coupled portion, and a second spring groove defined in the side surface of the side protrusion, wherein the second pad-coupled portion is inserted into the second spring groove.

The brake pad may include a coupling protrusion protruding from the side surface of the side protrusion and having a vertical dimension smaller than a vertical dimension of the side protrusion to form a step, and a third spring groove defined at the step between the coupling protrusion and the side protrusion, and the pad-coupled portion may include a third pad-coupled portion inserted into the third spring groove.

The third spring groove may be defined at each of an upper side and a lower side of the coupling protrusion, and the return spring may include a pair of third pad-coupled portions respectively coupled to the pair of third spring grooves, and a spring connection portion for connecting ends of the pair of third pad-coupled portions in the first direction to each other.

The caliper body may include a side slot receiving the side protrusion inserted thereinto and extending in the first direction, the load spring may include a spring clip fitted to an upper side of the side protrusion, and a vertical elastic portion in a U-shaped protruding from the spring clip in the second direction and bending again in the first direction, and a lower end of the vertical elastic portion may be in contact with a lower portion of the side slot.

According to one of the embodiments of the present disclosure, the pad liner may be removed and the three functions of the pad liner may be separately achieved to reduce the size of the unnecessary member and improve the performance.

In addition, as the torque shim is released from the factory in the state of being coupled to the brake pad, the hassle of aligning the position with the pad liner may be eliminated.

In addition, the manufacturing process may be simplified via the coupling structure of the brake pad and the return spring in the simple shape.

Effects obtainable from the present disclosure are not limited to the effects mentioned above, and other effects not mentioned will be clearly understood by those skilled in the art from the description below.

DESCRIPTION OF SPECIFIC EMBODIMENTS

Figure 1:
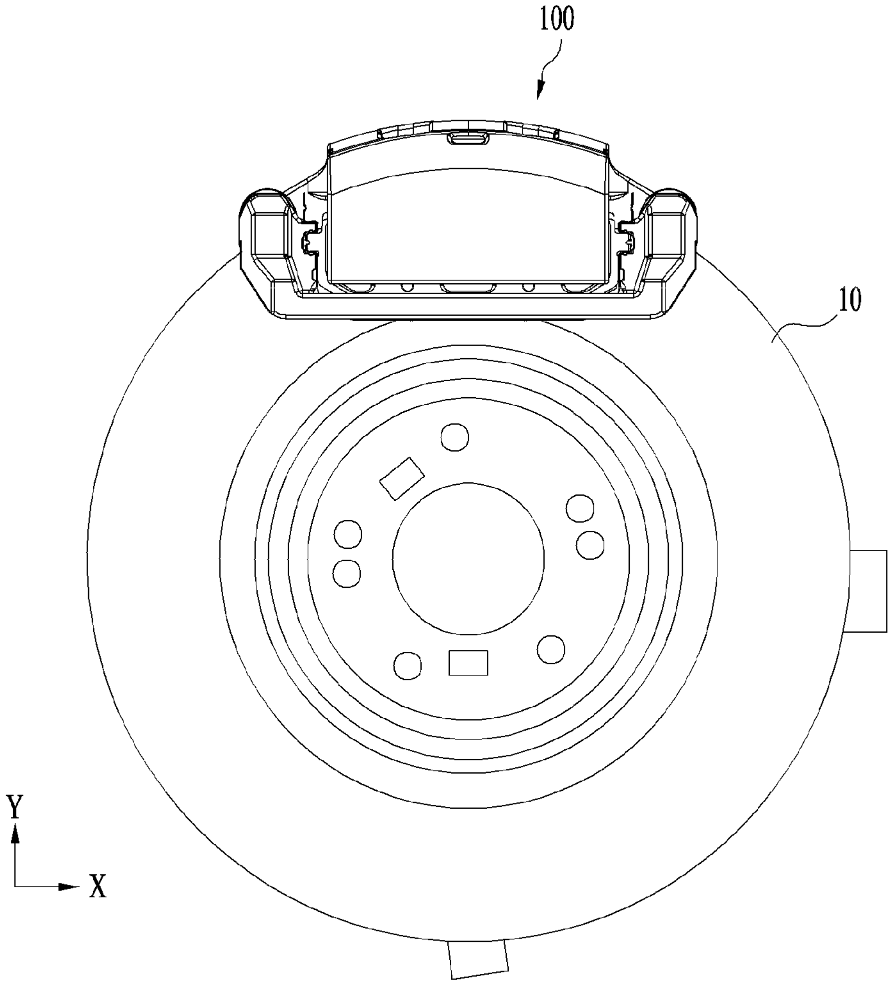
FIG. 1 is a front view of a brake device and a disk assembly according to one of embodiments of the present disclosure.

Advantages and features of the present disclosure, and a method for achieving the same, will become apparent with reference to the embodiments described below in detail in conjunction with the accompanying drawings. However, the present disclosure may not be limited to the embodiments disclosed below, but may be implemented in a variety of different forms. The present embodiments are provided only to ensure that the disclosure of the present disclosure is complete, and to completely inform those skilled in the art to which the present disclosure belongs, the scope of the present disclosure. The present disclosure is only defined by the scope of the claims.

The terminology used herein is for the purpose of describing the embodiments only and is not intended to limit the present disclosure. As used herein, the singular forms "a" and "an" are intended to include the plural forms as well, unless the context clearly indicates otherwise. As used herein, "comprises" and/or "comprising" do not exclude the presence or addition of one or more other components in addition to a stated component. Like reference numerals refer to like components throughout the specification, and "and/or" includes each of the mentioned components and every combination of one or more of the components. Although "first", "second", and the like are used to describe various components, it is apparent that such components are not limited by such terms. Such terms are only used to distinguish one component from another. Accordingly, it is apparent that the first component mentioned below may be the second component within the technical spirit of the present disclosure.

Unless otherwise defined, all terms including technical and scientific terms used herein have the same meaning as commonly understood by one of ordinary skill in the art to which the present disclosure belongs. In addition, terms defined in a commonly used dictionary are not to be interpreted ideally or excessively unless specifically defined explicitly.

Spatially relative terms "below", "beneath", "lower", "above", "upper", and the like may be used to easily describe a correlation between one component and other components as shown in the drawings. Spatially relative terms should be understood as terms including different directions of the components during use or operation in addition to directions shown in the drawings. For example, when a component shown in the drawings is flipped, a component described as being located "below" or "beneath" another component may be placed "above" said another component. Accordingly, the exemplary term "below" may include both downward direction and upward direction. Components may also be oriented in other directions, and thus, spatially relative terms may be interpreted based on the orientation.

FIG. 1 is a front view of a brake device 100 and a brake disk 10 according to one of embodiments of the present disclosure. Hereinafter, in describing the brake device 100, the reference of a vertical direction (a y-axis), a left and right direction (an x-axis), and a front and rear direction (a z-axis) is based on the brake device 100 shown in FIG. 1.

Wheels of a vehicle may be generally disposed on both left and right sides, and a front side shown in FIG. 1 may be disposed to face the outside of the vehicle. Depending on a type of the brake device 100, front and rear surfaces thereof may have a symmetrical shape (an opposed caliper brake) or a piston structure may be disposed only on one side thereof (a sliding caliper brake).

The opposed caliper brake is a scheme in which, while a main braking caliper body 110 is fixed, brake pads 120 are pressed from both sides so as to come into contact with the brake disk 10. This scheme has excellent braking power in that it is a symmetrical structure, but because pistons for the pressurization from both sides must be located on both sides, a volume of an outer portion of the wheel may be increased, and piston speeds on both sides must be synchronized to be equal to each other.

The sliding caliper includes a piston that presses only the brake pad 120 on one side, and is a structure in which the brake pad on the one side pushes the brake disk, and as a reaction, the main braking caliper body 110 slides and performs braking.

Because the main braking piston is disposed on only the one side, there are advantages of easy implementation and in not needing to adjust the speeds of the pistons on both sides to be equal to each other. However, the braking power is lower than that of the opposed caliper brake, so that the opposed caliper brake system is introduced in high-end vehicles.

In the opposed caliper brake, the brake disk is always located at a center of the caliper body, but in the sliding caliper brake, the caliper body is coupled to the brake disk in a slidable manner.

Referring to FIG. 1, the brake device 100 may apply braking to the wheel of the vehicle by pressing a surface of the brake disk 10. The brake disk 10 and a knuckle assembly are components connected to the wheel of the vehicle.

During travel of the vehicle, the brake disk 10 rotates along with the wheel. When the brake device 100 applies a pressure to the brake disk 10, a resistance to the rotation of the brake disk 10 may be generated to reduce a rotational speed of the wheel. That is, the vehicle may be braked.

Figure 2:
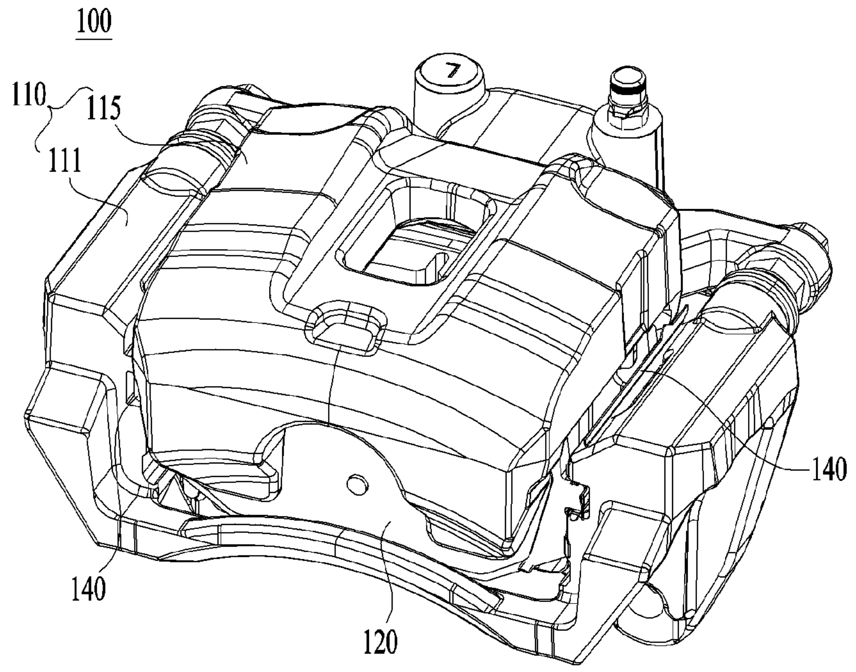
FIG. 2 is a diagram showing a conventional brake device.
Figure 3:
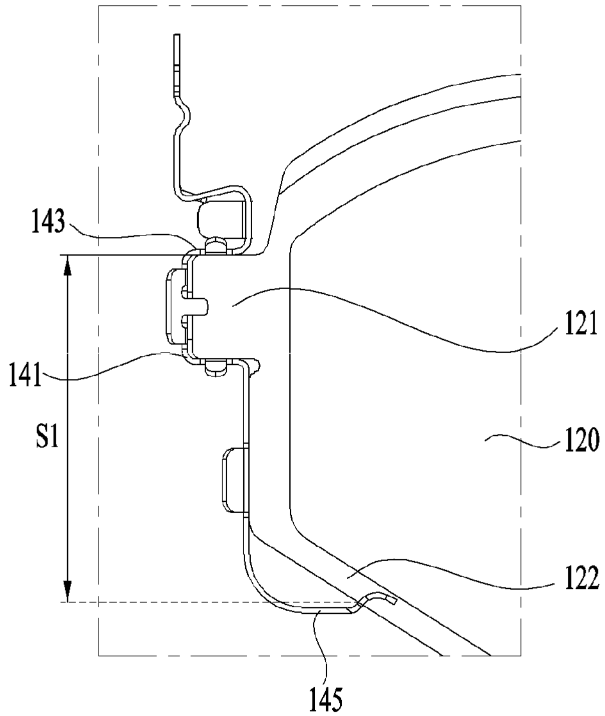
FIG. 3 is a diagram showing conventional brake pad and pad liner.
Figure 3:
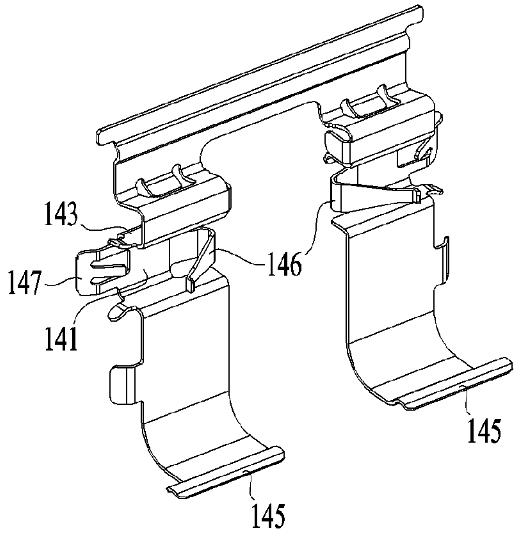

FIG. 2 is a diagram showing a conventional brake device 100, and FIG. 3 is a diagram showing conventional brake pad 120 and pad liner 140.

The brake device 100 is composed of the caliper body 110 into which one side of the brake disk 10 is inserted, the brake pad 120 mounted on the caliper body 110 and with a brake first surface facing the disk, and the pad liner 140 located between the brake pad 120 and the caliper body 110 and fixing a position of the brake pad 120.

The caliper body 110 may be composed of a first caliper body 111 on which the brake pad 120 is seated and located on left and right sides and below the brake pad 120, and a second caliper body 115 coupled to the first caliper body 111 from above and where the piston for pressurizing the brake pad 120 is located.

A friction member in contact with the brake disk 10 may be located on the first surface of the brake pad 120, and a second surface of the brake pad 120 may be constructed as a back plate to which a friction member is attached and pressed by the piston while being coupled to the caliper body 110.

The pad liner 140 located on the side of the brake pad 120 and disposed between the brake pad 120 and the first caliper body 111 may have a leaf spring shape as shown in (b) in FIG. 3. The pad liner 140 guides the brake pad 120 to be fixed while maintaining a predetermined gap without being in direct contact with the caliper body 110.

To support the brake pad 120 without interfering with a movement thereof in a first direction toward the brake disk 10, a vertical elastic portion 145 for supporting a lower portion of the brake pad 120 may be included. The vertical elastic portion 145 presses the brake pad 120 in an upward direction, and a reference surface 143, which is located above a first pad clip 141 for surrounding a side protrusion 125 of the brake pad 120, supports elasticity of the vertical elastic portion 145.

A behavior of the pad during the braking is determined by a dimensional tolerance of the pad, the pad liner 140, and a torque member, and an assembly clearance generated by the dimensional tolerance becomes a gap generated by the pad behavior that occurs during the braking. Due to such gap, squeal noise occurs when the pad behavior occurs. As a distance between the reference surface and the vertical elastic portion 145 increases, the behavior of the brake pad 120 during the braking increases, resulting in increased noise.

The conventional pad liner 140 implements a function of a return spring 150 in one member. When the brake pad 120 moves in the first direction, a return elastic portion 146 in contact with the first surface, which is a friction surface of the brake pad 120, applies a force in a second direction, which is an opposite direction, to restore the brake pad 120 to an original position thereof.

The return elastic portion 146 in a form of bending a portion of the pad liner 140 has a problem in terms of durability due to a weak elasticity thereof. In addition, as described above, when elasticity for fixing in the vertical direction is increased to reduce the gap in the vertical direction, the friction increases, and thus, the elasticity of the return elastic portion 146 is also required to be greater.

The return elastic portion 146 included in the conventional pad liner 140 is easily deformed by the sliding of the pad and has difficulty in load management such as return force lowering. In addition, because the pad liner 140 is coupled to the caliper body 110 and then coupled to the brake pad 120 again, there is a problem in alignment of the members.

Accordingly, in the brake device 100 according to the present disclosure, the pad liner 140 may be removed using the brake pad 120 that attaches a structure replacing the function of the pad liner 140 to the side protrusion 125.

As the functions integrated into the conventional pad liner 140 are separated from each other, each of the functions is improved, and as the brake pad 120 is coupled in advance and assembled to the caliper body 110, assembly is easy.

FIG. 4

Figure 4:
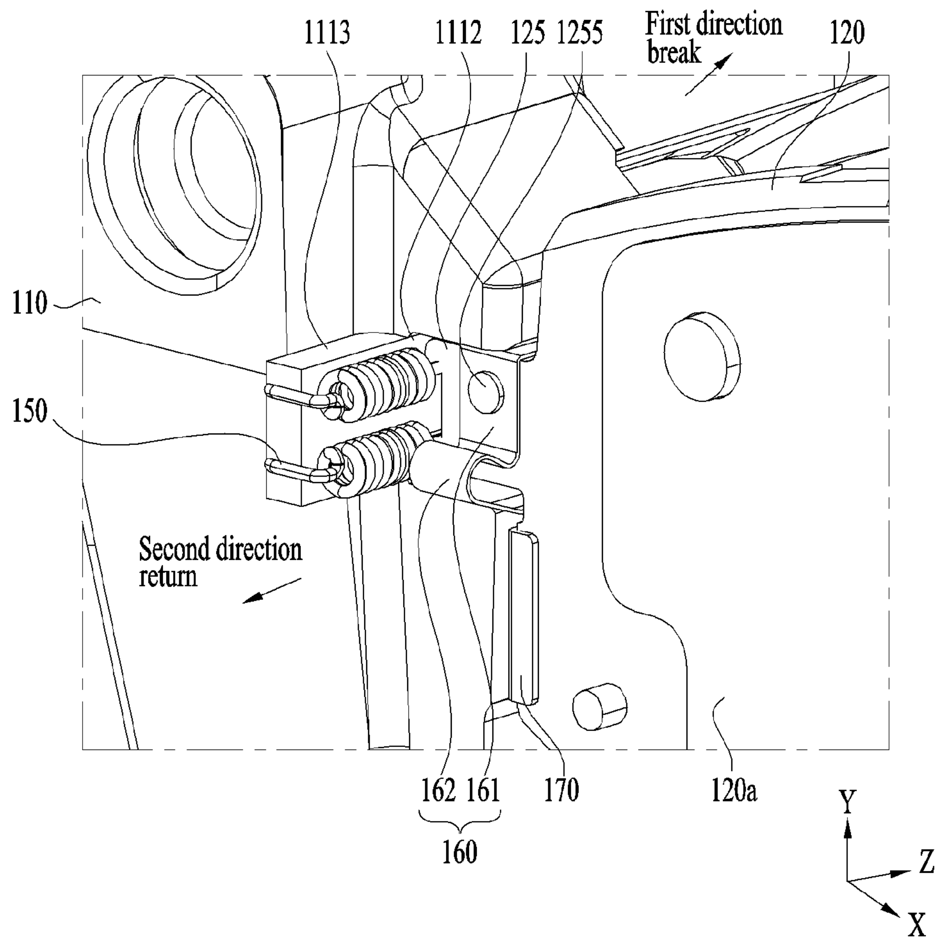
FIG. 4 is a perspective view of a coupling portion of a brake pad and a caliper body according to one embodiment of a brake device of the present disclosure viewed from the other side.
Figure 5:
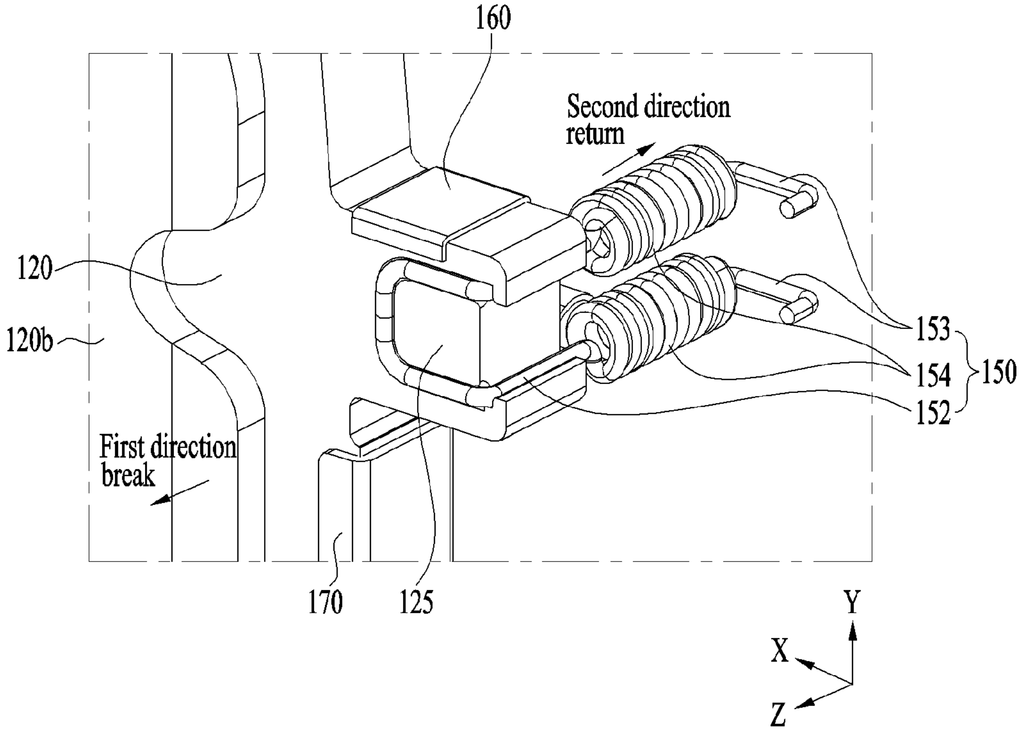
FIG. 5 is a perspective view of a return spring coupled to a side protrusion of a brake pad according to one embodiment of a brake device of the present disclosure viewed from one side.

FIG. 4 is a perspective view of a coupling portion of the brake pad 120 and the caliper body 110 of the brake device 100 according to the present disclosure viewed from the other side, and FIG. 5 is a perspective view of the return spring 150 coupled to the side protrusion 125 of the brake pad 120 of the brake device according to the present disclosure viewed from one side.

Figure 6:
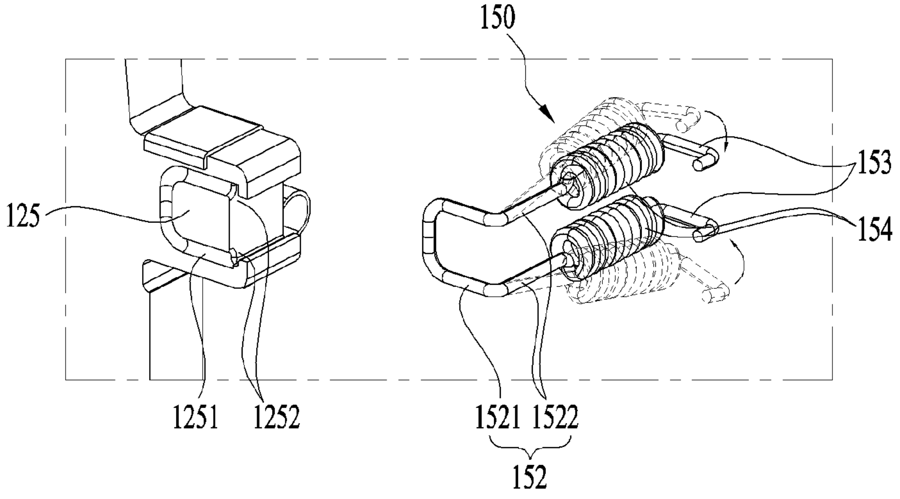
FIG. 6 is a view showing a method for coupling a return spring to a side protrusion of a brake pad according to one embodiment of a brake device of the present disclosure.

FIG. 5 is a view showing a first surface **120*a*, which is a side where the brake pad 120 moves during the braking, and FIG. 6 is a view showing a second surface 120*b*, which is an opposite side of the first surface, where the braking piston pressurizes the brake pad 120**.

The functions required in the conventional pad liner 140 largely include three functions: 1) a role of supporting a torque generated during operation of the brake pad 120 between the caliper body 110 and a side surface of the brake pad 120, 2) a load bearing function of supporting a lower portion of the brake pad 120, and 3) a return function to restore the brake pad 120 in the second direction.

Instead of removing the brake pad 120, a torque shim 170 may be implemented by coupling a metal plate for supporting the torque to the side surface of the brake pad 120 at a position in contact with the caliper body 110. The torque shim 170 according to the present disclosure is not coupled to the caliper body 110 but is able to be fitted to the side surface of the brake pad 120, so that assembly thereof is easy. Unlike the conventional pad liner 140 integrally formed with a leaf spring requiring elasticity, the torque shim 170 may be constructed with a material and a thickness effective for supporting the torque of the brake pad 120.

As shown in the drawing, the torque shim 170 may be constructed in a form that partially surrounds front and rear surfaces of the back plate of the brake pad 120, and may be released in a state of being fitted to the brake pad 120 or attached to the brake pad 120 in a factory.

In relation to the second function, the load bearing function, the lower portion of the brake pad 120 was supported by extending a lower portion of the pad liner 140. However, such scheme is executed at a location spaced downwardly apart from the side protrusion 125 where an upper portion of the brake pad 120 and the pad liner 140 are coupled to each other, so that there is a problem of shaking of the brake pad 120.

The greater the gap between the brake pad 120 and the caliper body 110 increases, the greater the vibration of the brake pad 120, so that the smaller the gap, the smaller the force for the load support spring to bear the load.

Accordingly, in the present disclosure, a load support spring that is fixed to the side protrusion 125 protruding from the side surface of the brake pad 120 and coupled to the caliper body 110, and supports the brake pad 120 from below the side protrusion 125 of the brake pad 120 may be used.

The caliper body 110 may include a side slot 1112 defined at a position corresponding to the side protrusion 125 and into which the side protrusion 125 is inserted. The side slot 1112 may have a shape of a slot extending in the first direction such that the side protrusion 125 may move in the first direction. A lower end of the load spring 160 may be coupled to a lower portion of the side slot 1112 and an upper end thereof may be fixed to the side protrusion 125 to reduce a gap between both ends of the load spring 160, thereby increasing a load bearing capacity.

More specifically, the load spring 160 may include a spring clip 161 fitted to the side protrusion 125 from above, and a U-shaped vertical elastic portion 162 protruding in the second direction from the spring clip 161 and bending in the first direction again, and a lower end of the vertical elastic portion 162 may be coupled to a lower portion of the side slot 1112.

When the vertical elastic portion 162 protrudes in the first direction, it may come into contact with the brake disk 10, so that, as shown in FIG. 4, it may protrude in the second direction. To fix the spring clip 161, a clip protrusion 1255 formed on the side protrusion 125 of the brake pad 120 and a fixing hole through which the clip protrusion 1255 extends may be formed in the spring clip 161.

The return spring 150 may include a pad-coupled portion 152 coupled to the side protrusion 125, a horizontal elastic portion 154 extending in the second direction from the pad-coupled portion 152, and a spring hook 153 caught on the caliper body 110 at an end of the horizontal elastic portion 154.

The horizontal elastic portion 154 may increase durability and a restoring force using a spirally wound elastic coil. As shown in FIG. 5, a pair of elastic coils may be arranged in the vertical direction, and when the braking piston pressurizes the brake pad in the first direction, the horizontal elastic portion 154 provides elasticity for the brake pad to be restored in the second direction.

The spring hook 153 fixed to the caliper body 110 may be coupled to an outer surface of the caliper body 110, and fix the return spring 150 to the caliper body 110. The spring hook 153 may include a pair of spring hooks like the horizontal elastic portion 154, and a protrusion 1113 may be formed on the caliper body 110 such that the spring hook 153 is caught thereto.

FIG. 6 is a view showing a method for coupling the return spring 150 to the side protrusion 125 of the brake pad 120 of the brake device 100 according to the present disclosure.

The pad-coupled portion may include a first pad-coupled portion 1521 coupled to the first surface of the side protrusion 125 and a second pad-coupled portion 1522 coupled to a side surface of the side protrusion 125. The first pad-coupled portion 1521 and the second pad-coupled portion 1522 may be bent in an L shape.

The pad-coupled portion may have a U-shape, the first pad-coupled portion 1521 may have a connected shape, and the pair of horizontal elastic portions 154 may be coupled to both ends of the second pad-coupled portion 1522.

A first spring groove 1251 in which the first pad-coupled portion 1521 is seated may be defined in the first surface of the side protrusion 125, and a pair of second spring grooves 1252 into which the second pad-coupled portion 1522 is inserted may be defined in the side surface of the side protrusion 125.

Because the first pad-coupled portion 1521 is connected in the U-shape, the first spring groove 1251 may have a U-shape corresponding to the shape of the first pad-coupled portion 1521 and may have a concave form in the first surface.

A pair of second pad-coupled portions 1522 may be bent from the first pad-coupled portion 1521 and arranged side by side, and a pair of second spring grooves 1252 facing each other in the vertical direction such that the second pad-coupled portions 1522 extend therethrough may be included.

The pair of second spring grooves 1252 are open in directions of the first surface and the second surface, so that the second pad-coupled portions 1522 extend therethrough. The upper second spring groove 1252 is opened in a downward direction and the lower second spring groove 1252 is opened in the upward direction.

The pad-coupled portions 1521 and 1522 are connected to each other, but are opened in a direction of the spring hook 153, so that the pad-coupled portions 1521 and 1522 may be respectively coupled to the spring grooves 1251 and 1252 of the side protrusion 125 by being pressed in a direction narrowing a gap between the pair of spring hooks 153.

When the gap between the pair of spring hooks 153 narrows, a gap between the second pad-coupled portions 1522 also narrows, so that the second pad-coupled portions 1522 are able to be inserted into a space between the pair of second spring grooves 1252, and when the force pressing the spring hooks 153 is removed, the second pad-coupled portions 1522 are inserted into the second spring grooves 1252 while increasing the gap therebetween.

The first pad-coupled portion 1521 may be seated in the first spring groove 1251 by pulling the return spring 150 in the second direction.

The return spring 150 may maintain a state of being fixed to the side protrusion 125 of the brake pad 120 because the second pad-coupled portions 1522 have elasticity to maintain the certain gap by the elasticity of the first pad-coupled portion 1521 for maintaining the U-shape.

Figure 7:
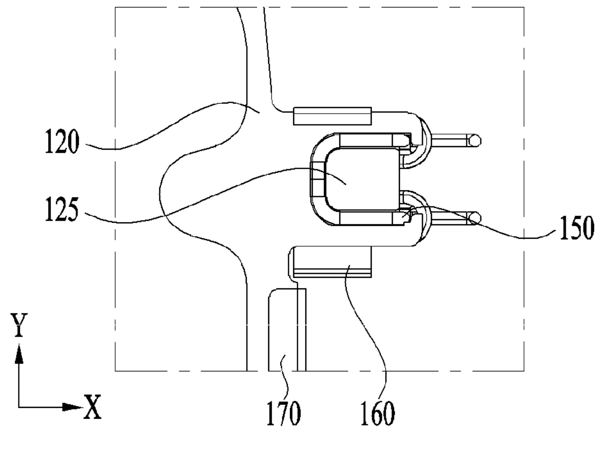
FIG. 7 shows views of one surface and a side surface of a side protrusion in FIG. 5.
Figure 7:
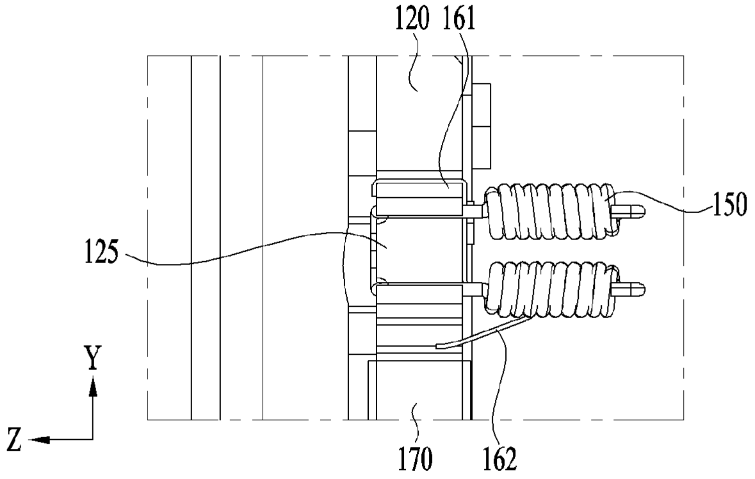

FIG. 7 shows views of one surface and a side surface of the side protrusion 125 in FIG. 5. The return spring 150 may be coupled to the first surface and the side surface of the side protrusion 125, and the load spring 160 may be coupled to the upper surface and the second surface of the side protrusion 125, so that the return spring 150 and the load spring 160 may be disposed so as not to overlap each other.

FIG. 8

Figure 8:
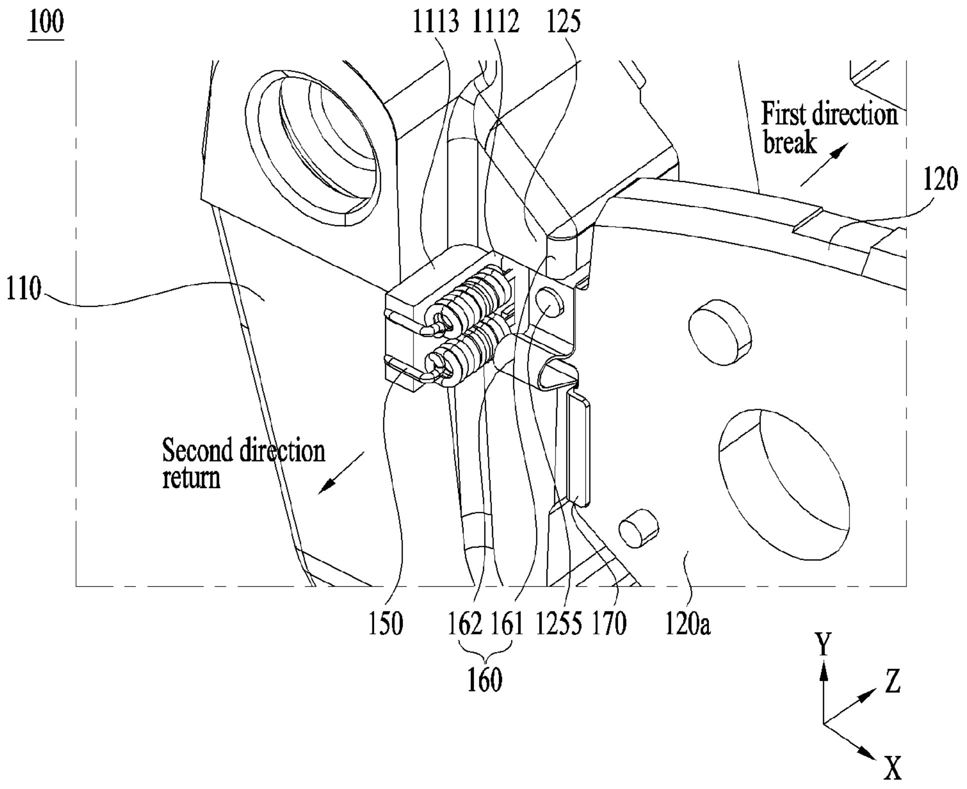
FIG. 8 is a perspective view of a coupling portion of a brake pad and a caliper body according to another embodiment of a brake device of the present disclosure viewed from the other side.
Figure 9:
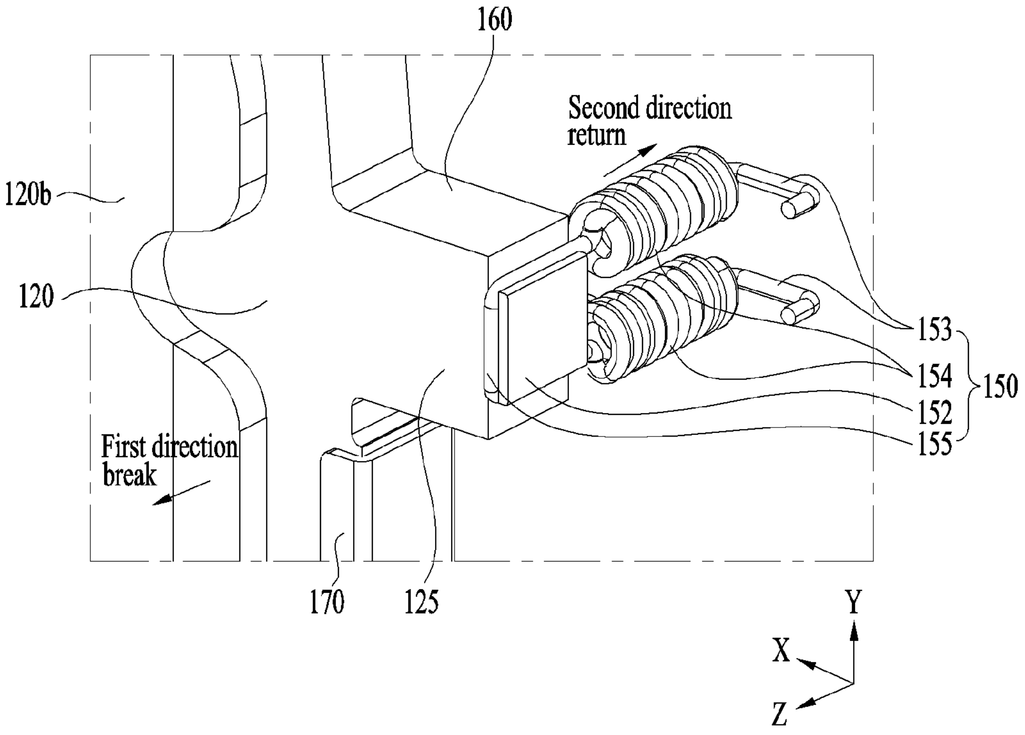
FIG. 9 is a perspective view of a return spring coupled to a side protrusion of a brake pad according to one embodiment of a brake device of the present disclosure viewed from one side.

FIG. 8 is a perspective view of the coupling portion of the brake pad 120 and the caliper body 110 according to another embodiment of the brake device 100 of the present disclosure viewed from the other side, and FIG. 9 is a perspective view of the return spring 150 coupled to the side protrusion 125 of the brake pad 120 according to one embodiment of the brake device 100 of the present disclosure viewed from one side.

FIG. 8 shows the first surface 120*a* of the brake pad 120, that is, the surface that causes the friction against the brake disk 10. FIG. 9 shows the second surface 120*b*, which is on the opposite side, and the second surface 120*b* is a surface on which the brake piston pressurizes the brake pad 120.

The present embodiment is different from the embodiment of FIGS. 4 to 7 in a shape of the return spring 150, but the torque shim 170 and the load spring 160 have the same structures. Therefore, detailed descriptions will be omitted for the torque shim 170 and the load spring 160.

Because the return spring 150 is coupled to the side protrusion 125, the protrusion 113 may protrude in the second direction from the side slot 1112 into which the side protrusion 125 is inserted.

Figure 10:
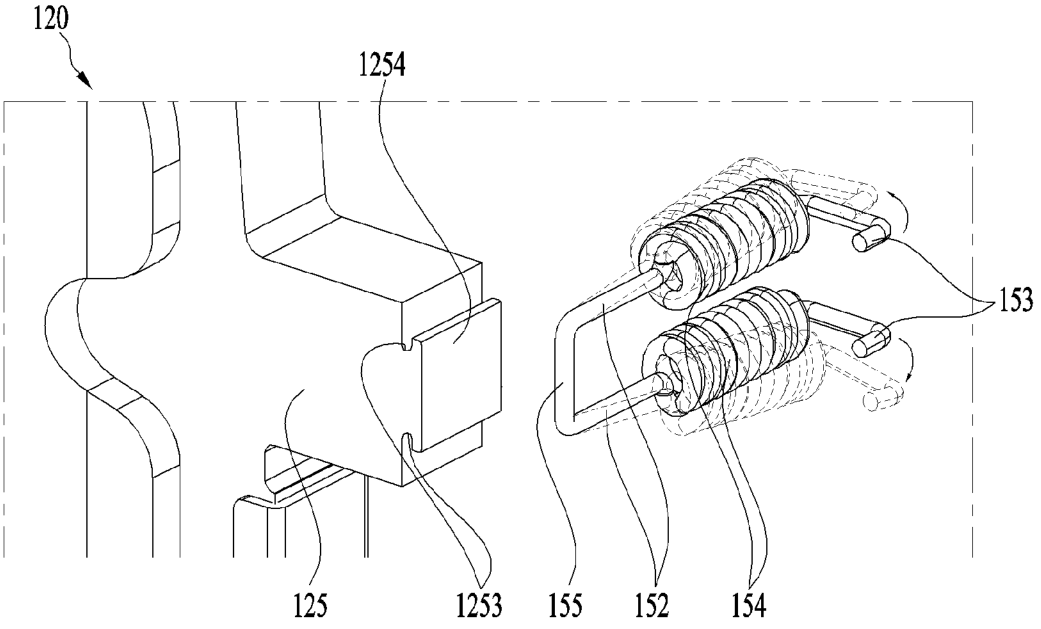
FIG. 10 is a view showing a method for coupling a return spring to a side protrusion according to another embodiment of a brake pad of a brake device of the present disclosure.

FIG. 10 is a view showing a method for coupling the return spring 150 to the side protrusion 125 according to another embodiment of the brake pad 120 of the brake device 100 of the present disclosure.

The return spring 150 includes the pad-coupled portion 152 inserted into a third spring groove 1253 defined in the side protrusion 125. The pad-coupled portion 152 extends in the first direction (the second direction) corresponding to an extending direction of the horizontal elastic portion 154, and the third spring groove 1253 is also a groove extending in the first direction. Ends in the first direction and the second direction of the third spring groove 1253 may be open, so that both ends of the pad-coupled portion 152 may be positioned outside the third spring groove 1253.

The return spring 150 may include one horizontal elastic portion 154, one spring hook 153, and one pad-coupled portion 152, but may include the pair of horizontal elastic portions 154, the pair of spring hooks 153, and the pair of pad-coupled portions 152 as shown in FIG. 8 to provide sufficient elasticity and facilitate the coupling to the side protrusion 125 of the brake pad 120.

The pair of horizontal elastic portions 154, the pair of spring hooks 153, and the pair of pad-coupled portions 152 may be connected to each other via a spring connection portion 155 connected to ends in the first direction of the pair of pad-coupled portions 152 to form one piece.

The spring connection portion 155 may be perpendicular to the pair of pad-coupled portions 152 so as to form a shape, and the spring connection portion 155 may be regarded as a portion of the pad-coupled portion 152. A spring groove for the spring connection portion 155 may be defined in the first surface of the side protrusion 125, and as shown in FIG. 10, the spring groove in which the spring connection portion 155 is seated may not be defined in the side protrusion 125.

Because the return spring 150 contains a metal material, when a predetermined force is applied thereto, the gap between the pair of pad-coupled portions 152 may be widened or narrowed, and when the force is removed, the pair of pad-coupled portions 152 may be restored to the original shape.

The second spring grooves 1252 of the embodiment in FIG. 4 described above are arranged such that the open directions thereof face each other, and the second spring grooves 1252 may be defined by processing the side protrusion 125 such that a horizontal end thereof is retracted and then etching the side protrusion 125 again in the vertical direction.

The spacing of the pair of second spring grooves 1252 having such structure is smaller than a vertical dimension of the side protrusion 125, and a vertical dimension of the return spring 150 may be smaller than that of the side protrusion 125.

The present embodiment has the spring groove of the different shape than the second spring groove 1252 of the embodiment of FIG. 4 described above, and is referred to as the third spring groove 1253 so as to be distinguished from the spring groove of the above-described embodiment. Unlike the embodiment of FIG. 4 described above, the third spring grooves 1253 are opened in opposite directions (see FIG. 11).

That is, the third spring groove 1253 located on an upper side is opened in the upward direction, so that the pad-coupled portion 152 is inserted thereinto from above, and the third spring groove 1253 located on a lower side is opened in the downward direction, so that the pad-coupled portion 152 is inserted thereinto from below.

Because a space between the pair of third spring grooves 1253 is not empty, the spring connection portion 155 for connecting the pair of pad-coupled portions 152 to each other does not need to be bent as shown in the embodiment of FIG. 4, and the spring connection portion 155 is fixed to the brake pad 120 in a shape of only extending in the vertical direction. A manufacturing process of bending the return spring 150 may be omitted, and a length of the return spring 150 may be shortened, thereby reducing a manufacturing cost.

In addition, in the embodiment of FIG. 4, the second spring groove 1252 must be additionally processed in the vertical direction at the retracted portion of the side protrusion 125 after the side protrusion 125 is processed to be retracted in the horizontal direction at the end thereof, and there is a need for a process of processing the first spring groove 1251 in the first surface of the side protrusion.

However, the third spring grooves 1253 of the present embodiment may be simply processed into a form retracted in the downward direction of the side protrusion 125 and a form retracted in the upward direction, thereby simplifying the process.

Figure 11:
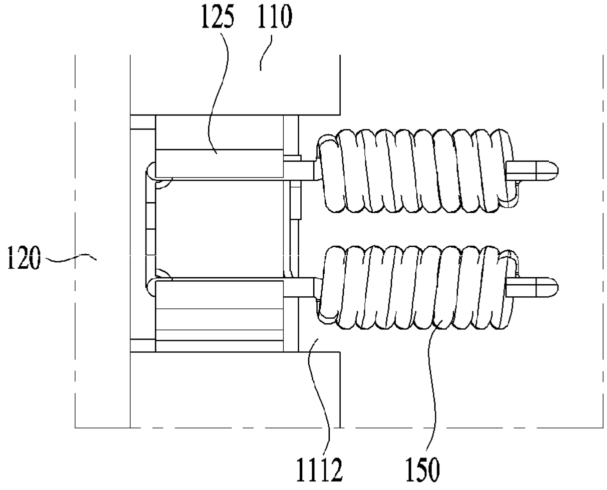
FIG. 11 is a view showing a shape change of a return spring in response to a movement of a brake pad according to another embodiment of the brake pad of a brake device of the present disclosure.
Figure 11:
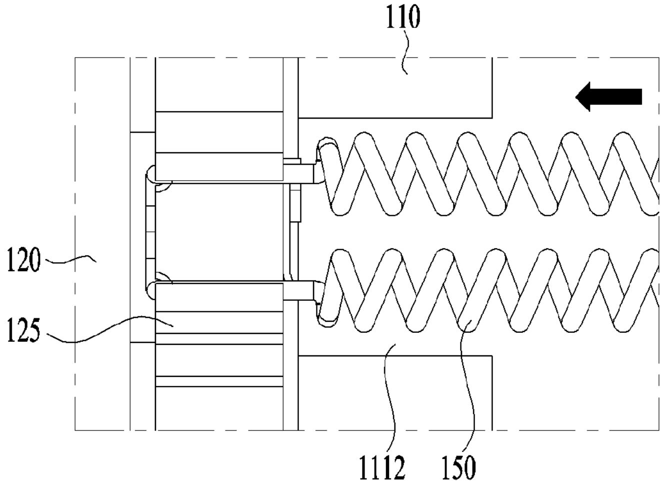

FIG. 11 is a view showing a shape change of the return spring 150 in response to the movement of the brake pad 120 according to another embodiment of the brake pad 120 of the brake device 100 of the present disclosure. (a) in FIG. 11 is a view showing a state before the braking, and (b) in FIG. 11 is a view showing a state in which the brake pad 120 moves in the first direction during the braking.

As shown in (b) in FIG. 11, the return spring 150 may be inserted into the side slot 1112 during tension, that is, when the brake pad 120 moves toward the brake disk 10. That is, the vertical dimension of the return spring 150 must be smaller than a size of the side slot 1112, so that the brake pad 120 may freely move in the first direction and the second direction.

The horizontal elastic portion 154 has the coil spring shape and has a cylindrical shape, and thus, occupies a predetermined volume, so that the third spring grooves 1253 to which the pad-coupled portions 152 are fastened must be located below an upper end of the side protrusion 125 and above a lower end for an inner surface of the side slot 1112 and the horizontal elastic portion 154 do not come into contact with each other.

Referring to FIG. 10, a coupling protrusion 1254 protruding from the end of the side protrusion 125 may be further included to define the third spring grooves 1253 below the upper end and above the lower end of the side protrusion 125.

The coupling protrusion 1254 protruding from the end of the side protrusion 125 has a length in the vertical direction smaller than that of the side protrusion 125, so that a step may be formed with the side protrusion 125. When the third spring groove 1253 is defined at the stepped between the side protrusion 125 and the coupling protrusion 1254, the spacing between the third spring grooves 1253 becomes smaller than the vertical dimension of the side protrusion 125, and the return spring 150 is able to move into the side slot 1112 as shown in FIG. 10.

After widening a gap between the pair of horizontal elastic portions 154, the pair of horizontal elastic portions 154 are fitted to the coupling protrusion 1254, and then the pad-coupled portions 152 are inserted into the third spring grooves 1253, so that the return spring 150 may be coupled to the brake pad 120 in the form shown in FIG. 9.

There are advantages that it is easy to process the side protrusion 125 to define the third spring groove 1253, and a risk of breakage of the side protrusion 125 is small as a vertical dimension of the side protrusion 125 is greater than that of the end of the side protrusion 125 located above and below the second spring groove 1252 in FIG. 4.

As described above, the three functions of the pad liner 140 may be separately achieved to reduce the size of the unnecessary member and improve the performance. In addition, the torque shim may maintain the state of being coupled to the brake pad 120.

In addition, as the torque shim is released from the factory in the state of being coupled to the brake pad 120, the hassle of aligning the position with the pad liner 140 may be eliminated.

In addition, the manufacturing process may be simplified via the coupling structure of the brake pad and the return spring 150 in the simple shape.

As described above, the detailed description of the preferred embodiments of the present disclosure is provided such that those skilled in the art may implement and practice the present disclosure. Although the description has been made above with reference to the preferred embodiments of the present disclosure, those skilled in the art will understand that the present disclosure may be modified and changed in various ways within a range that does not deviate from the scope of the present disclosure.

What is claimed is:

1. A brake device comprising:

a caliper body;

a brake pad disposed on the caliper body and including a friction member positioned on a first surface of the brake pad and side protrusions protruding from side surfaces of the brake pad;

a return spring having one side coupled to one of the side protrusions of the brake pad and the other side coupled to the caliper body; and a load spring having one side coupled to the one of the side protrusions of the brake pad and the other side coupled to the caliper body, and supporting a weight in a vertical direction of the brake pad, wherein the return spring includes a spirally wound elastic coil configured to provide elasticity for restoring a position of the brake pad that has moved in a first direction in a second direction opposite to the first direction, the spirally wound elastic coil extends in the second direction, the return spring further includes: a pad-coupled portion coupled to the one of the side protrusions, and a spring hook caught on the caliper body at an end of the spirally wound elastic coil, the spirally wound elastic coil extends in the second direction from the pad-coupled portion, the spirally wound elastic coil includes a pair of spirally wound elastic coils and the spring hook includes a pair of spring hooks, and the pad-coupled portion has a U-shape connected to the pair of spirally wound elastic coils.

2. The brake device of claim 1, wherein the pad-coupled portion includes:

a first pad-coupled portion coupled to a first surface of the one of the side protrusions; and a second pad-coupled portion extending in the second direction from the first pad-coupled portion and coupled to a side surface of the side protrusion.

3. The brake device of claim 1, wherein the one of the side protrusions includes a third spring groove extending in the first direction and is defined in a side surface of the one of the side protrusions, wherein the pad-coupled portion includes a third pad-coupled portion inserted into the third spring groove.

4. The brake device of claim 3, wherein the brake pad further includes a coupling protrusion protruding from the side surface of the one of the side protrusions and having a vertical dimension smaller than a vertical dimension of the one of the side protrusions to have a step with the one of the side protrusions, wherein the third spring groove is defined at the step between the coupling protrusion and the one of the side protrusions.

5. The brake device of claim 4, wherein the third spring groove is defined at each of an upper side and a lower side of the one of the coupling protrusions, wherein the return spring includes:

a pair of third pad-coupled portions respectively coupled to the pair of third spring grooves; and a spring connection portion for connecting ends of the pair of third pad-coupled portions in the first direction to each other.

6. The brake device of claim 5, wherein the pair of third spring grooves are respectively retracted in a downward direction of the one of the coupling protrusions and in an upward direction of the one of the coupling protrusions opposite to the downward direction.

7. The brake device of claim 1, wherein the caliper body includes:

a side slot receiving the one of the side protrusions inserted thereinto and extending in the first direction; and a protrusion extending from the side slot in the second direction, wherein the spring hook is caught on the protrusion of the caliper body.

8. The brake device of claim 1, wherein the caliper body includes a side slot receiving the one of the side protrusions inserted thereinto and extending in the first direction.

9. The brake device of claim 8, wherein the load spring includes:

a spring clip fitted to an upper side of the one of the side protrusions; and a vertical elastic portion in a U-shaped protruding from the spring clip in the second direction and bending again in the first direction, wherein a lower end of the vertical elastic portion is in contact with a lower portion of the side slot.

10. The brake device of claim 9, further comprising:

a clip protrusion disposed on the one of the side protrusions, wherein the spring clip includes a fixing hole, wherein the clip protrusion is fitted into the fixing hole.

11. The brake device of claim 1, further comprising:

a torque shim coupled to the side surface of the brake pad, located below the one of the side protrusions, and facing the caliper body.

12. A brake device comprising:

a caliper body;

a brake pad disposed on the caliper body and including a friction member positioned on a first surface of the brake pad and side protrusions protruding from side surfaces of the brake pad;

a return spring having one side coupled to one of the side protrusions of the brake pad and the other side coupled to the caliper body; and a load spring having one side coupled to the one of the side protrusions of the brake pad and the other side coupled to the caliper body, and supporting a weight in a vertical direction of the brake pad, wherein the return spring includes a spirally wound elastic coil configured to provide elasticity for restoring a position of the brake pad that has moved in a first direction in a second direction opposite to the first direction, the spirally wound elastic coil extends in the second direction, the return spring further includes: a pad-coupled portion coupled to the one of the side protrusions, and a spring hook caught on the caliper body at an end of the spirally wound elastic coil, the spirally wound elastic coil extends in the second direction from the pad-coupled portion, the pad-coupled portion includes: a first pad-coupled portion coupled to a first surface of the one of the side protrusions, and a second pad-coupled portion extending in the second direction from the first pad-coupled portion and coupled to a side surface of the side protrusion, and the one of the side protrusions includes:

a first spring groove defined in the first surface of the one of the side protrusions so as to correspond to the first pad-coupled portion; and a second spring groove defined in the side surface of the one of the side protrusions, wherein the second pad-coupled portion is inserted into the second spring groove.

13. A vehicle comprising:

a vehicle body;

a wheel located beneath the vehicle body and rotatable;

a brake disk coupled to the wheel and rotatable together with the wheel;

a caliper body located on one side of the brake disk;

a brake pad disposed on the caliper body and including a friction surface on one surface of the brake pad and side protrusions protruding from side surfaces of the brake pad;

a return spring having one side coupled to one of the side protrusions of the brake pad and the other side coupled to the caliper body; and a load spring having one side coupled to the one of the side protrusions of the brake pad and the other side coupled to the caliper body, and supporting a weight in a vertical direction of the brake pad, wherein the return spring includes a spirally wound elastic coil configured to provide elasticity for restoring a position of the brake pad that has moved in a first direction in a second direction opposite to the first direction, the spirally wound elastic coil extends in the second direction, wherein the return spring further includes: a pad-coupled portion coupled to the one of the side protrusions, and a spring hook extending from an end of the spirally wound elastic coil and caught on the caliper body, the spirally wound elastic coil extends in the second direction from the pad-coupled portion, the pad-coupled portion includes: a first pad-coupled portion coupled to a first surface of the one of the side protrusions, and a second pad-coupled portion extending in the second direction from the first pad-coupled portion and coupled to a side surface of the side protrusion, wherein the one of the side protrusions includes: a first spring groove defined in the first surface of the one of the side protrusions so as to correspond to the first pad-coupled portion, and a second spring groove defined in the side surface of the one of the side protrusions, wherein the second pad-coupled portion is inserted into the second spring groove.

14. The vehicle of claim 13, wherein the brake pad includes:

a coupling protrusion protruding from the side surface of the one of the side protrusions and having a vertical dimension smaller than a vertical dimension of the one of the side protrusions to have a step with the one of the side protrusions; and a third spring groove defined at the step between the coupling protrusion and the one of the side protrusions, wherein the pad-coupled portion includes a third pad-coupled portion inserted into the third spring groove.

15. The vehicle of claim 14, wherein the third spring groove is defined at each of an upper side and a lower side of the one of the coupling protrusions, wherein the return spring includes:

a pair of third pad-coupled portions respectively coupled to the pair of third spring grooves; and a spring connection portion for connecting ends of the pair of third pad-coupled portions in the first direction to each other.

16. The vehicle of claim 13, wherein the caliper body includes a side slot receiving the one of the side protrusions inserted thereinto and extending in the first direction, wherein the load spring includes:

a spring clip fitted to an upper side of the side protrusion; and a vertical elastic portion in a U-shaped protruding from the spring clip in the second direction and bending again in the first direction, wherein a lower end of the vertical elastic portion is in contact with a lower portion of the side slot.

* * * * *